United States Patent [19]

Singer

[11] 4,023,304

[45] May 17, 1977

[54] PORTABLE COMPARTMENTED LURE-HOLDING TACKLE BOX

[76] Inventor: Alex Singer, 29 Jackson Place, Massapequa, N.Y. 11758

[22] Filed: June 16, 1976

[21] Appl. No.: 696,540

[52] U.S. Cl. .................... 43/54.5 R; 312/DIG. 33
[51] Int. Cl.² ....................................... A01K 97/04
[58] Field of Search .......... 43/54.5 R; 312/DIG. 33, 312/244

[56] References Cited

UNITED STATES PATENTS

| | | | |
|---|---|---|---|
| 2,098,636 | 11/1937 | Smith et al. | 43/54.5 R |
| 2,203,008 | 6/1940 | Bauman | 312/DIG. 33 |
| 2,677,486 | 5/1954 | Schermerhorn | 43/54.5 R X |

FOREIGN PATENTS OR APPLICATIONS

| | | | |
|---|---|---|---|
| 239,187 | 12/1945 | Switzerland | 312/DIG. 33 |
| 673,093 | 6/1952 | United Kingdom | 312/DIG. 33 |

Primary Examiner—Hugh R. Chamblee
Assistant Examiner—Daniel J. Leach

[57] ABSTRACT

In a preferred embodiment, a lure-segregating compartmentalized fishing tackle box having forward and rearward compartments, with the forward compartment space divided into a plurality of forwardly and rearwardly rows of separate lure-holding segregated spaces segregated into rows of laterally serially-arranged separate spaces by a removable insert forming upright walls to the separate spaces. Forward row walls are shorter than rearward row walls and opposite ends of the tackle box have side wall portions of varying heights corresponding to the shorter forward row walls and to the higher rearward row walls. The forward compartment and the rearward compartment are separated by an upright wall partition positioned for equalizing forward and rearward mass substantially equally of the tackle box and for joining to an upper portion thereof a handle structure having lid-fastening apertures therein receivable of a back compartment lid on the back upright wall of the tackle box. Separate forward hinged lids are securable over the lure-holding spaces, and an accessory drawer is provided beneath the first and second compartments and slidably inserted through a forward upright wall of the tackle box. The rearward wall of the tackle box slants rearwardly from bottom to top whereby an upper space of the rearward compartment is wider in a forward to rearward direction than the lower space of that compartment.

12 Claims, 2 Drawing Figures

PORTABLE COMPARTMENTED LURE-HOLDING TACKLE BOX

This invention is directed to a portable lure-storing fishing tackle box.

BACKGROUND OF THE INVENTION

Prior to the present invention, there has existed a variety of designs of fishing tackle boxes such as for example those of U.S. Pat. No. 3,399,939 issued Sept. 3, 1968, and U.S. Pat. No. 3,606,511 issued Sept. 20, 1971, and U.S. Pat. No. 859,228 issued May 17, 1937 as well as various utility boxes utilizable as fishing tackle boxes such as of U.S. Pat. No. 3,301,619 issued Jan. 31, 1967. There have been heretofore inherent disadvantages and shortcomings of not only the above-noted boxes but all others typically represented by the above boxes. Typical disadvantages have included the complexity and bulk of the boxes as well as the lack of ready convenience of access to individual lures and tackle separate one from the other, and the lack of provisions of storage accessibly of lures of varying lengths and sizes, as well as failing to concurrently provide for general storage of various miscellaneous tackle together with lack of provisions facilitating easy removal thereof from compartment(s) of the box. Particularly there has been inadequate provision for avoiding entanglement with concurrently stored lures and other miscellaneous fishing tackle.

SUMMARY OF THE INVENTION

Accordingly, objects of the present invention include the overcoming and avoiding of problems and difficulties and disadvantages of tackle boxes, of the types referred to above, together with the obtaining of novel advantages.

Another object is to obtain a portable fishing tackle box having individual compartments for each lure, with structure to prevent snagging between lures while providing ready access thereto, irrespective of size and length of the lure, and while providing isolation from other tackle.

Another object is to provide for optional use of lure storage space for other purposes such as for additional miscellaneous fishing tackle in need of storage.

Another object is to provide for separate access to stored lures apart from access to stored other miscellaneous fishing tackle.

Another object is to provide improved access to miscellaneous storage of tackle.

Another object is to obtain one or more preceding objects within a minimal amount of space and with a minimal amount of structure in order to avoid a cumbersome tackle box and to simultaneously obtain a portable tackle box conveniently and easily portable, and providing concurrently for easy access to and manipulation of lids and the drawer(s) and stored materials during transport on one's person.

Another object is to provide for proper drainage together with preceding one or more objects.

Another object is to provide for an insertable and removable partitioning structure for the lure-storage compartment space.

Another object is to provide a tackle box adapted to reflect smaller size corresponding to shorter storage compartments designed for short lures and for higher storage compartments designed for longer lures.

Other objects become apparent from the preceding and following disclosure.

One or more objects are obtained by the embodiments hereafter disclosed as illustrative typically of the present invention.

Broadly the invention may be defined as a portable fishing tackle box having a bottom wall with adjoining back and side walls extending upwardly therefrom around a periphery of the bottom wall, and having an upright partitioning wall positioned within the space defined within a vessel formed by the bottom and adjoined back and side walls, with the upright partitioning wall thereby defining at least first and second compartments accessible from substantially a top opening to each thereof, at least a first compartment formed thereby having removably inserted therewithin partitioning upright wall structure forming at least first and second lure-storage space adjacent respective first and preferably forward side wall structures of predetermined short height adapted to storage of a lure of short length and a second wall structure of a predetermined large height adapted for compartmentalizing a lure of a long length or large size, with the vessels upright side walls being preferably of corresponding heights to the respective short and large heights of the lure storage-space defining structures. Each of the lure storage spaces associated with the respective short height, and separately with the respective large height, including additional over-hang suspending structures each shaped and positioned for suspending a lure downwardly into the space provided therefor and such that a lure suspended by a hook portion thereof on the overhanging suspending structure of the respective storage space thus avoids snagging lures of adjacent segregated lure-storing spaces, and preferably having a separate upright extension adjacent the overhanging structure totally segregating the lure hook from an adjacent space.

Preferably the upright side walls of the box correspond, as noted above, to the height of respective lure-storage compartment structures, thus providing for a minimal amount of excess vessel forming wall structure and a minimum of unneeded space within the vessel itself. Preferably also an upper portion of the upright partitioning wall is provided with handle structure and accessories for grasping and transporting of the box, with the partitioning wall being positioned such that when grasped and lifted by the handle and/or handle accessories, a substantially equal amount of mass is on the forward and rearward portions or locations of the upright partitioning wall thereby providing for equal weight and ease of carrying. The lure-storage space defining structure preferably is removably inserted into the forward compartment space, with the forward wall portions being of the short height and the rearward wall portions being of the larger height, and accordingly with the corresponding wall portions of the box for the forward compartment being of corresponding forwardly short height and rearwardly large height.

There is provided in a preferred embodiment a lid and fastening mechanism thereof for each of the forward and rearward compartments. Preferably the lure storage compartment-defining structure defines a plurality of rows ranging from the forwardly located short-height walls thereof to the rearwardly one or more rows of increasing heights to the large height walls, and concurrently defines a plurality of segregated spaces for short lures and rearward rows having a plurality of laterally adjacent spaces segregated from one another for longer lures. In a further preferred embodiment, there is provided separate lid structure for the lure storage forward space apart from the lid structure for the rearward compartment, thus making it easier and less cumbersome to gain access to the lures, particularly when transporting the case concurrently. The rearward lid for the rearward compartment is preferably hinged on the upper edge of the back wall of the box, and fastens at the front edge of the lid with aperture(s) within the handle portion of the upright partitioning wall. In like manner, the forward compartment lid structures preferably are two parts one hinged in opposing relationship to the other on opposite upper edges of the forward side walls of the forward compartment, and fastened to one another detachably and both fit substantially flush preferably, with the upper portions of the lure-storage space structures.

In a further preferred embodiment, there is a second bottom or floor wall forming space between it and the vessel (box) outside bottom wall as a drawer space having a receptacle in a forward substantially upright wall with a slidable drawer inserted therein. Preferably the drawer has a removable partitioning insert structure partitioning the drawer space into the compartment spaces.

The invention may be better understood by making reference to the following Figures.

THE FIGURES

Figure 1:
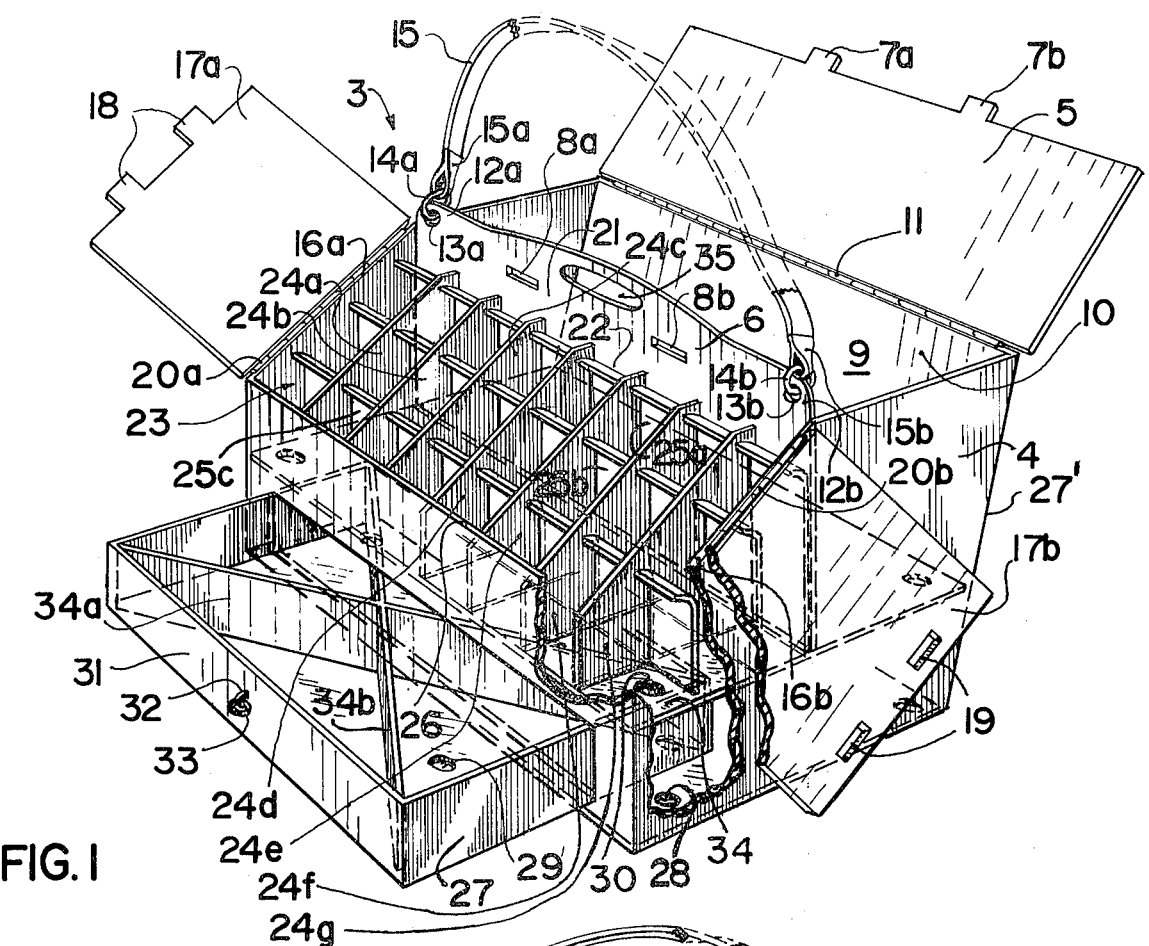
FIG. 1 illustrates a front-side perspective view of a preferred embodiment, illustrating the lids and drawer in an open state.
Figure 2:
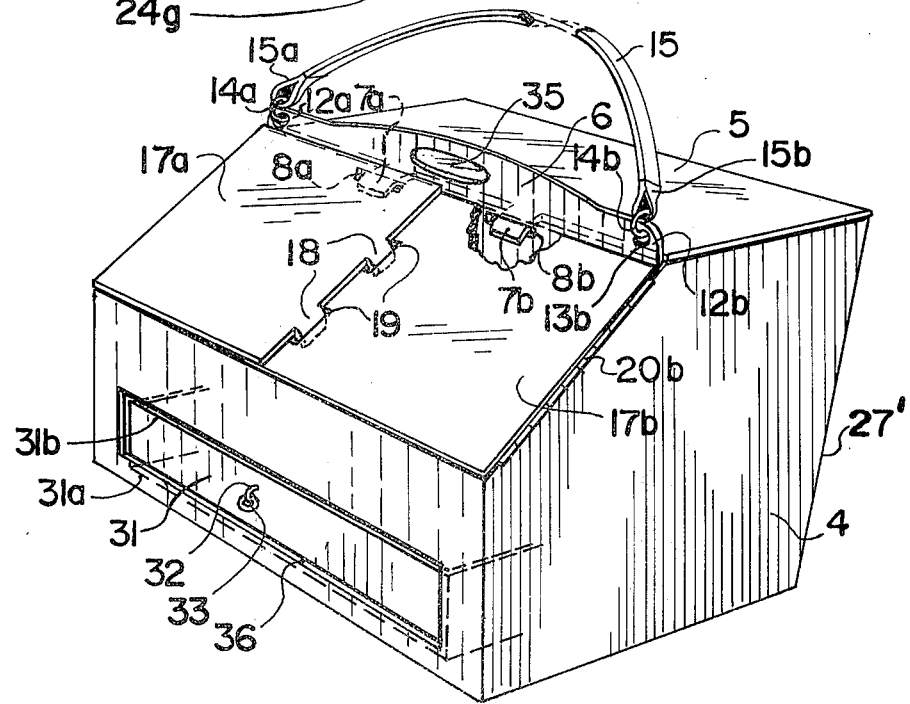
FIG. 2 illustrates a substantially identical perspective view as that of FIG. 1, except in a state of closed and fastened lids and drawer.

Both illustrations of FIGS. 1 and 2 include cut-away portions for improved illustration of features thereof.

DETAILED DESCRIPTION OF THE INVENTION

FIGS. 1 and 2, being the same embodiment in different states of being, references to the Figures are the same, except that some are best illustrated on one Figure and others are best illustrated on the other Figure as to various features, elements, and the like.

Accordingly, in FIG. 1 the embodiment is identified as portable fishing tackle box 3 having opposite end walls 4 and a bottom having drain aperture 28 therein, and having an upper floor or bottom 34 defining therebetween a drawer space with a drawer 27 positioned therein, extending a receptacle 31b in a forward face of the front upright wall of the box. Back upright wall 9 slants rearwardly upwardly at a slant of up to about 5° preferably and preferably not less than about 2°. Forwardly compartmentalizing partitioning upright wall 6 is attached to each of opposite ends 4 and extends above the level of the end walls 4 sufficiently for handle ring apertures 13a and 13b to receive the rings 14a and 14b for the belt ends 15a and 15b of the belt 15. There is also the finger-insertable passage 35 thereby forming a handle for grasping. Also there are lid latching apertures 8a and 8b receivable of the rear lid insert-tabs 7a and 7b of the rear lid 5. Thus, the wall 6 defines the rearward space 10 which can be closed by the pivoting of the lid 5 on the hinges 11, and as shown in FIG. 2, the tabs 7a and 7b are locked within the flange 12a and 12b at apertures 8a and 8b respectively, securing the lid in a locked state. Forward of the partitioning wall 6 is a space 21 between the wall and the upper-most forwardly extending overhang structure 22 of the lure-storage compartmentalizing structural insert 23, which is angled upwardly from front to rear along an upper surface thereof, thus providing for the storage of lures of differing lengths, and accordingly the forward portions of the opposite ends 4 angle upwardly at 16a and 16b. Mounted therealong are the hinges 20a and 20b mounting the respective compartment doors 17a and 17b with their latching opposing tabs 18 and insert apertures 19, shown in the latched state in FIG. 2. Upright partitioning walls 24a through 24g divide the forward compartment into a series of spaces consecutively in series between opposite walls 4, and the partitioning insert walls 25a, 25b, and 25c partition further these spaces into forward to rearward rows of lure storage spaces extending between the forward wall 26 and the upright partitioning wall 6 between which the insert 23 is removably placed, resting on floor 34 having drain holes 30 therein. Drawer 27 has drain holes 29 therein, and has a partitioning insert with X-shaped insert walls (partitions) 34a and 34b, preferably removable optionally. The slant of the rearward wall 9 may be observed at corner 27'.

As illustrated in FIG. 2, the drawer is slidably inserted into the drawer space through the receptacle, with the forward drawer face 31 sinking behind a wedge-shaped angular lip below the level of the outer surface of the lower lip 36 of the receptacle, angling rearwardly downwardly to a lower edge 31a. Thus, the drawer does not readily accidentally slide out forwardly, but may be lifted, as pulling forwardly over the lip, by grasping the handle ring 33 within the ring staple 32. The various parts as defined in the preceding disclosure, each, or part thereof, or all thereof may be of any desired plastic, metal, fabric, wood, or other composition as desired, as polyethylene, Nylon (TM). Preferably, however, the case and insert are all made of a moldable plastic. Typically, the box front, side and back walls may be of polystyrene; but preferably the base of the drawer (tray) is of polypropylene — which is resistant to deterioration caused normally by plastic worms.

Size, variations in shape and composition may vary within ordinary skill in this art.

I claim:

1. A portable fishing tackle box comprising in combination: a vessel having a bottom wall, and connected thereto back and side walls extending upwardly from the bottom wall at substantially a peripheral edge thereof; an upright partitioning wall positioned within space defined between the back and side upright walls and adapted to divide the space into a first compartment and a second compartment accessible from a top opening thus formed for each respectively of the first compartment and the second compartment; lure holder means for forming segregated lure-storing spaces segregated by partitioning upright wall structure and having a first lure-storing space formed adjacent a space-defining first wall of predetermined short height adapted for the storage of a lure of short length, and having a second lure-storing space formed adjacent a space-defining second wall of predetermined large height adapted for the storage of a lure of long length, and further for suspending in each of the first and second lure-storing spaces a lure from a suspending structure shaped and positioned for each of the first and second lure-storing spaces to overhang the respective space thereof such that snagging between lures of adjacent segregated lure-storing spaces is avoided, said lure holder means being positioned within at least one of said first and second compartments.

2. A portable fishing tackle box of claim 1, in which said side upright walls vary in height from point to point corresponding to heights of said predetermined short height and of said predetermined large height adapted such that low height walls provide for easy access to lures of short length and high walls provide adequate encompassing housing for lure space in which long lures are stored.

3. A portable fishing tackle box of claim 2, including handle means for grasping and transporting the tackle box as a whole, the handle means being a part of said upright partitioning wall, the partitioning wall being positioned and anchored to and between the side walls at predetermined locations adapted such that structural masses anterior to and posterior to the upright partitioning wall are substantially equal whereby the tackle box is substantially balanced when held by the handle means.

4. A portable fishing tackle box of claim 3, in which said lure holder means is removably insertable into the first compartment and said first compartment being located anterior to the upright partitioning wall, and in which the first and second walls extend from forwardly to rearwardly substantially uprightly, having the first wall of the predetermined short height located anterior to the second wall of the predetermined large height, and accordingly having low portions of the side walls located forwardly and high portions of the side walls located rearwardly alongside the first compartment.

5. A portable fishing tackle box of claim 4, including lid means for providing top portions to each of said first and second compartments, fastened onto at least said back wall, for securing space of the first and second compartments against loss of lures from the first compartment and fishing tackle from the second compartment.

6. A portable fishing tackle box of claim 5, in which said lure holder means forms a plurality of side-by-side receptacles of said first lure-storing space in an anteriorly located row of storage spaces, and forms a plurality of side-by-side receptacles of said second lure-storing space in a rearwardly located row of storage spaces.

7. A portable fishing tackle box of claim 6, in which said lid means comprises separate forward and rearward closure lid structures for the first and second compartments respectively, the rearward closure lid structure being pivotally hinged to said back wall, and the forward closure lid structure being hinged to at least one of the side upright walls.

8. A portable fishing tackle box of claim 7, in which said rearward closure lid structure fastens forwardly detachably to said handle means within latching apertures formed thereby.

9. A portable fishing tackle box of claim 1, in which said second compartment is rearward to said first compartment and is in-part formed by said back wall, said back wall being inclined from a forwardly located lower portion thereof to a rearwardly located upper portion thereof forming thereby a space within the second compartment having narrow dimensions forward to rearward at its bottom and broad dimensions forward to rearward at its top.

10. A portable fishing tackle box of claim 1, including a second bottom wall substantially horizontal and parallel to an outer lower bottom wall and defining between the two a drawer space beneath the first and second compartments, and a forward upright wall forming a drawer-receiving receptacle therein to said drawer space, and a drawer slidably positioned within each of said receptacle and said drawer space.

11. A portable fishing tackle box of claim 10, including a detachable partitioning insert mounted within space of said drawer, partitioning space within the drawer into segregated compartments.

12. A portable fishing tackle box of claim 1, in which said bottom wall includes drain holes therethrough positioned for effective draining of water collected within space above the botton wall.

* * * * *